United States Patent [19]
Kremidas

[11] Patent Number: 5,319,980
[45] Date of Patent: Jun. 14, 1994

[54] BOARD CONSTRUCTION FOR RESISTIVE STRAIN GAUGE PRESSURE SENSORS

[75] Inventor: James R. Kremidas, Fenton, Mich.

[73] Assignee: MacLean-Fogg Company, Mundelein, Ill.

[21] Appl. No.: 825,076

[22] Filed: Jan. 24, 1992

Related U.S. Application Data

[63] Continuation-in-part of Ser. No. 711,947, Jun. 7, 1991, Pat. No. 5,174,158.

[51] Int. Cl.$^5$ .............................. G01L 7/08; G01L 9/06
[52] U.S. Cl. .............................. 73/721; 73/720; 73/726; 73/727; 73/756; 338/4; 29/621.1
[58] Field of Search ............... 73/727, 726, 721, 720, 73/756, DIG. 4, 754; 338/4, 42; 29/621.1

[56] References Cited

U.S. PATENT DOCUMENTS

| | | | |
|---|---|---|---|
| 3,772,628 | 11/1973 | Underwood et al. | 338/4 |
| 4,295,376 | 10/1981 | Bell | 73/724 |
| 5,174,158 | 12/1992 | Kremidas | 73/756 |

OTHER PUBLICATIONS

"Measuring Devices", Section 6.4, p. 428.

Primary Examiner—Donald Woodiel
Attorney, Agent, or Firm—Krass & Young

[57] ABSTRACT

A resistive strain gauge pressure sensor including upper and lower housings coacting to define a pressure chamber within the housing. A board member assembly is clamped between the housings and defines a diaphragm portion which extends across the pressure chamber to divide the pressure chamber into upper and lower chamber portions. The board member assembly includes a relatively thin plate member, including a diaphragm portion, and a relatively thick support member bonded to the upper face of the thin plate member and including an annular portion positioned in surrounding relation to the diaphragm portion. The circuitry of the sensor is screen printed onto the lower face of the plate member and includes the various resistor elements of the strain gauge assembly, the various elements of the conditioning circuit receiving the output of the strain gauge assembly, and the various further leads required to connect the circuitry elements to the terminals of the sensor. The sensor terminals are provided by a plurality of connector pins extending downwardly through the plate member for connection at their respective lower ends to the circuitry provided on the lower face of the plate member.

7 Claims, 5 Drawing Sheets

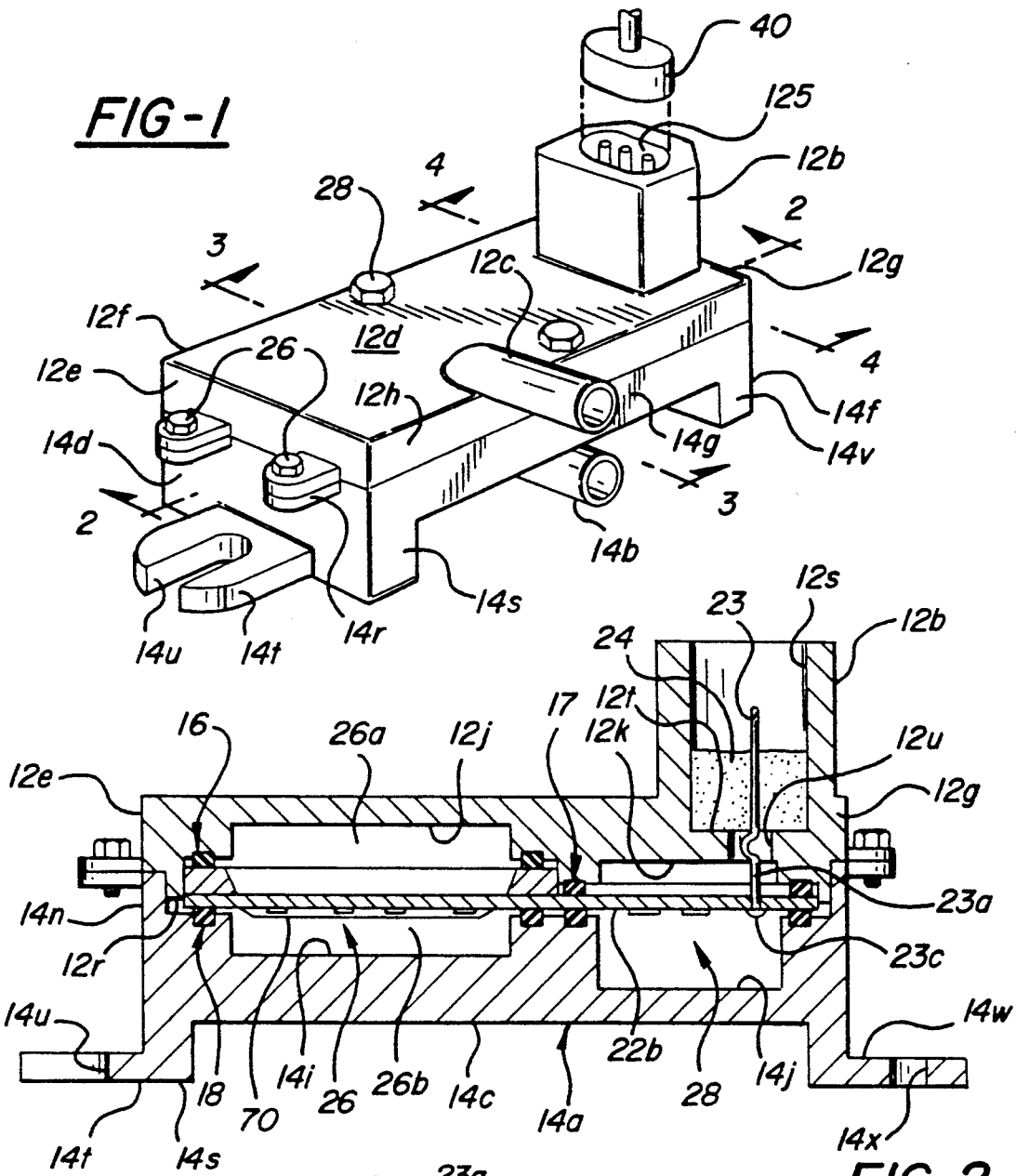
FIG-1
FIG-2
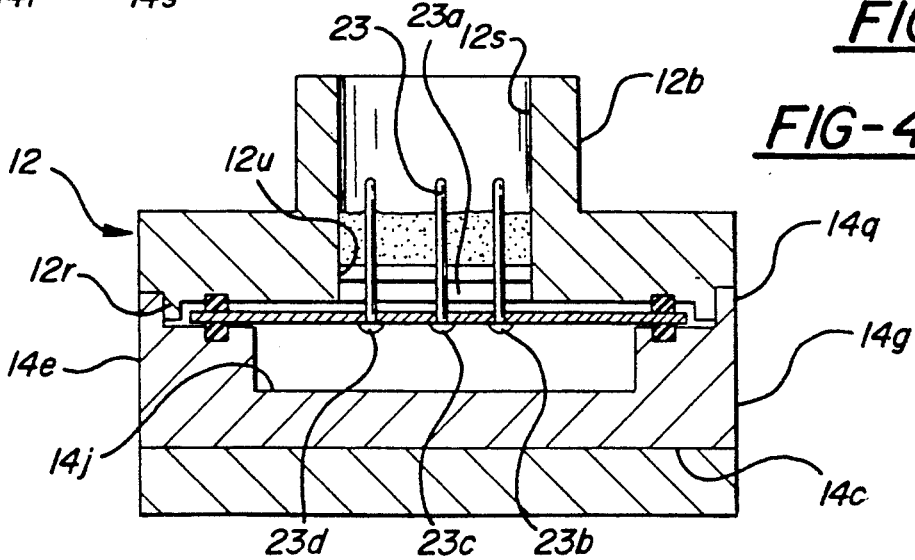
FIG-4

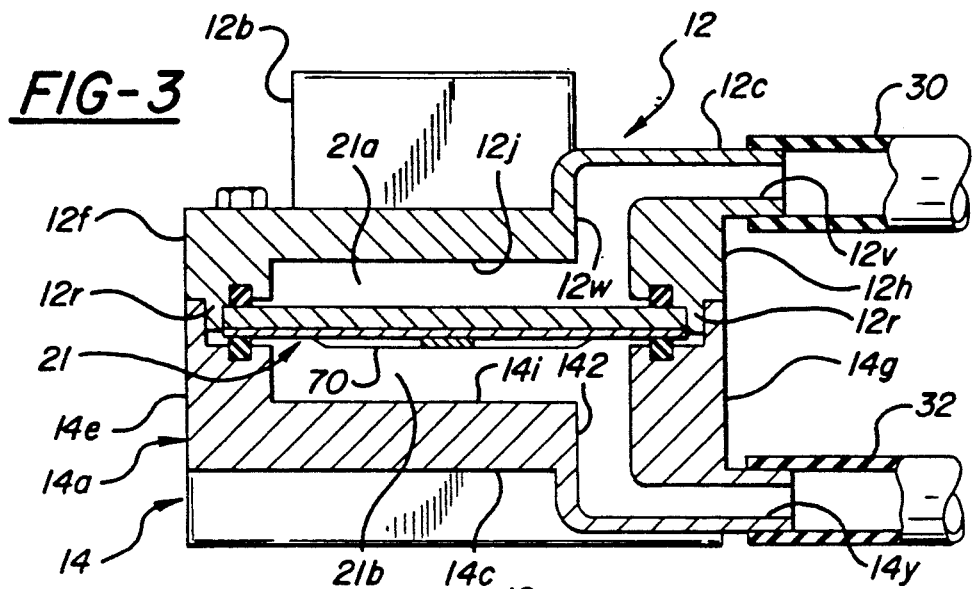
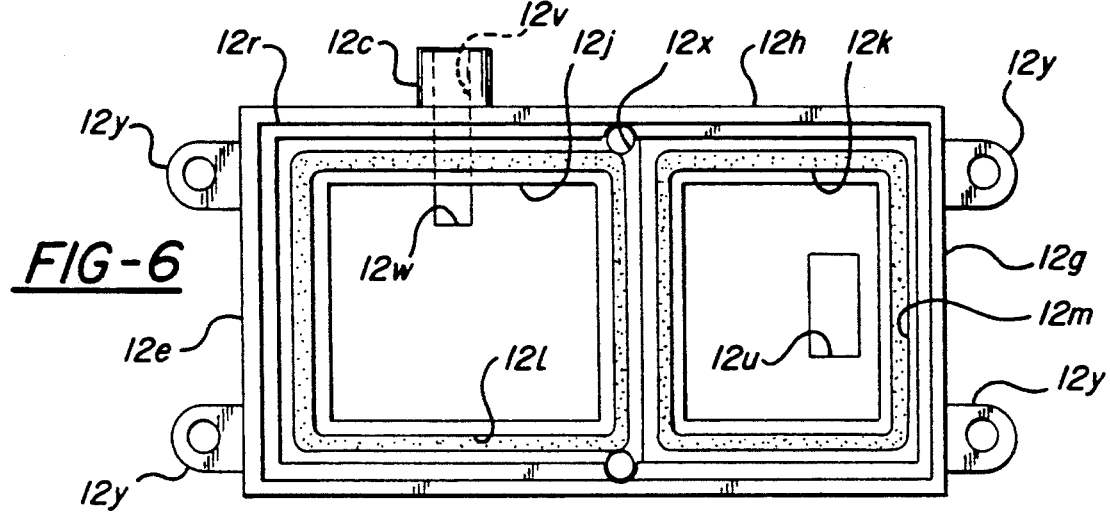
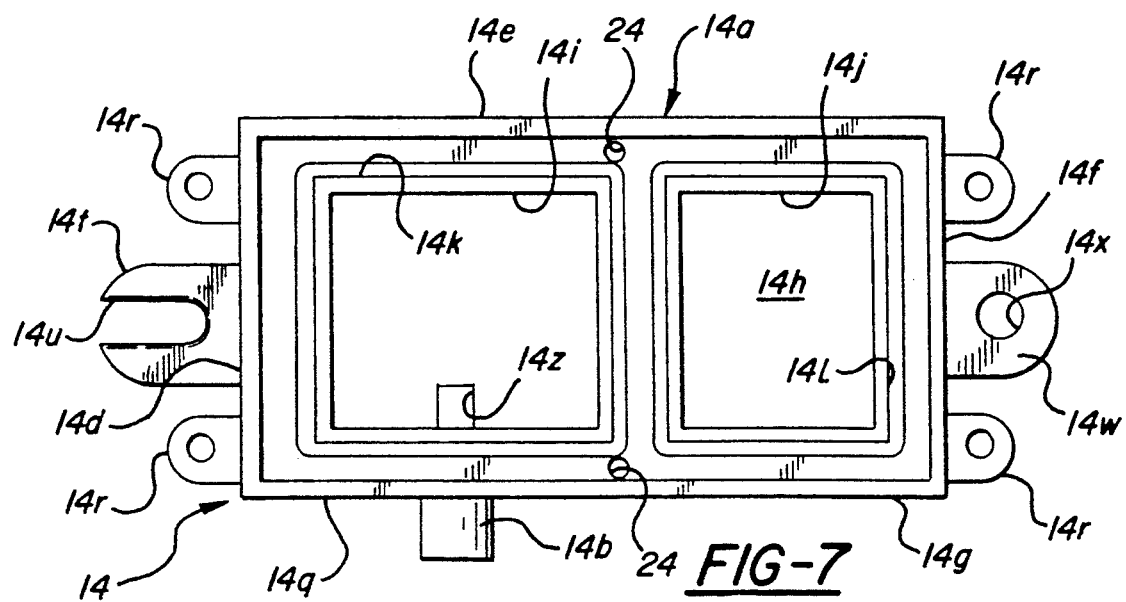

5,319,980

BOARD CONSTRUCTION FOR RESISTIVE STRAIN GAUGE PRESSURE SENSORS

REFERENCE TO RELATED APPLICATION

This application is a continuation-in-part of U.S. patent application Ser. No. 711,947, filed on Jun. 7, 1991, U.S. Pat. No. 5,174,158.

BACKGROUND OF THE INVENTION

This invention relates to pressure transducers and more particularly to resistive strain gauge pressure sensors.

It is often necessary to determine the pressure of gases and liquids for purposes of measurement or control and many transducers and sensors have been proposed to facilitate the determination of the pressure of gases and liquids. One general type of transducer or sensor for such applications is a resistive strain gauge sensor in which the pressure is sensed and measured based on dimensional changes in the strain gauges which generate proportional changes in the resistance of the gauges.

Whereas many types of resistive strain gauge pressure sensors have been designed and made commercially available, and whereas the various resistive strain gauge sensors have proven to be generally satisfactory, these gauges tend to be rather expensive both in terms of labor and material. Specifically, the design of prior art resistive strain gauge sensors have been relatively expensive either by virtue of the expense of the materials required to form the sensor or by virtue of the complicated processes required to manufacture the sensor.

SUMMARY OF THE INVENTION

This invention is directed to the provision of a resistive strain gauge pressure sensor having a simple, inexpensive, and effective design.

More specifically, this invention is directed to the provision of a resistive strain gauge pressure sensor having a relatively inexpensive design and yet retaining superior performance characteristics.

The invention pressure sensor is of the type including a housing defining a chamber, a board member assembly mounted within the housing and extending across the chamber to divide the chamber into an upper chamber portion above the board member assembly and a lower chamber portion below the board member assembly and a resistive strain gauge assembly positioned on the board member assembly and operative to receive a voltage input and generate a voltage output in response to flexing of the board member assembly.

According to the invention, the board member assembly includes a relatively thin plate member including a diaphragm portion, and a relatively thick support member bonded to one face of the thin plate member and including an annular portion positioned in surrounding relation to the diaphragm portion, and the resistive strain gauge assembly comprises a plurality of resistive strain gauge members positioned on the other face of the thin plate member on the diaphragm portion of the thin plate member. This board member construction allows the complicated and expensive materials and processes to be limited to a minor portion of the board member assembly so as to minimize the cost of the board member assembly.

According to a further feature of the invention, the thin plate member further includes a mounting portion extending laterally from the diaphragm portion within the housing, terminal pins accessible without the housing and connected to the mounting portion, and a conditioning circuit provided on the other face of the thin plate member on the mounting portion of the thin plate member and electrically connected to the strain gauge assembly and to the terminal pins. This arrangement further facilitates the inexpensive manufacture of the board member assembly.

According to a further feature of the invention, an annular seal is positioned between the housing and the annular portion of the support member and a further annular seal is positioned between the housing and an annular surface defined by the board member assembly in surrounding relation to the diaphragm portion. This seal arrangement provides a simple and effective means of mounting the board member assembly within the housing.

In one alternate embodiment of the invention the board member assembly further includes another annular member secured to the free annular face of the annular portion of the support member.

BRIEF DESCRIPTION OF THE DRAWINGS

FIG. 1 is a perspective view of a sensor according to the invention;

FIGS. 2, 3, and 4 are cross-sectional views taken respectively on lines 2—2, 3—3 and 4—4 of FIG. 1;

FIG. 6 is a bottom view of an upper housing employed in the invention sensor;

FIG. 7 is a top view of a bottom housing employed in the invention sensor;

DETAILED DESCRIPTION OF THE PREFERRED EMBODIMENTS

Figure 5:
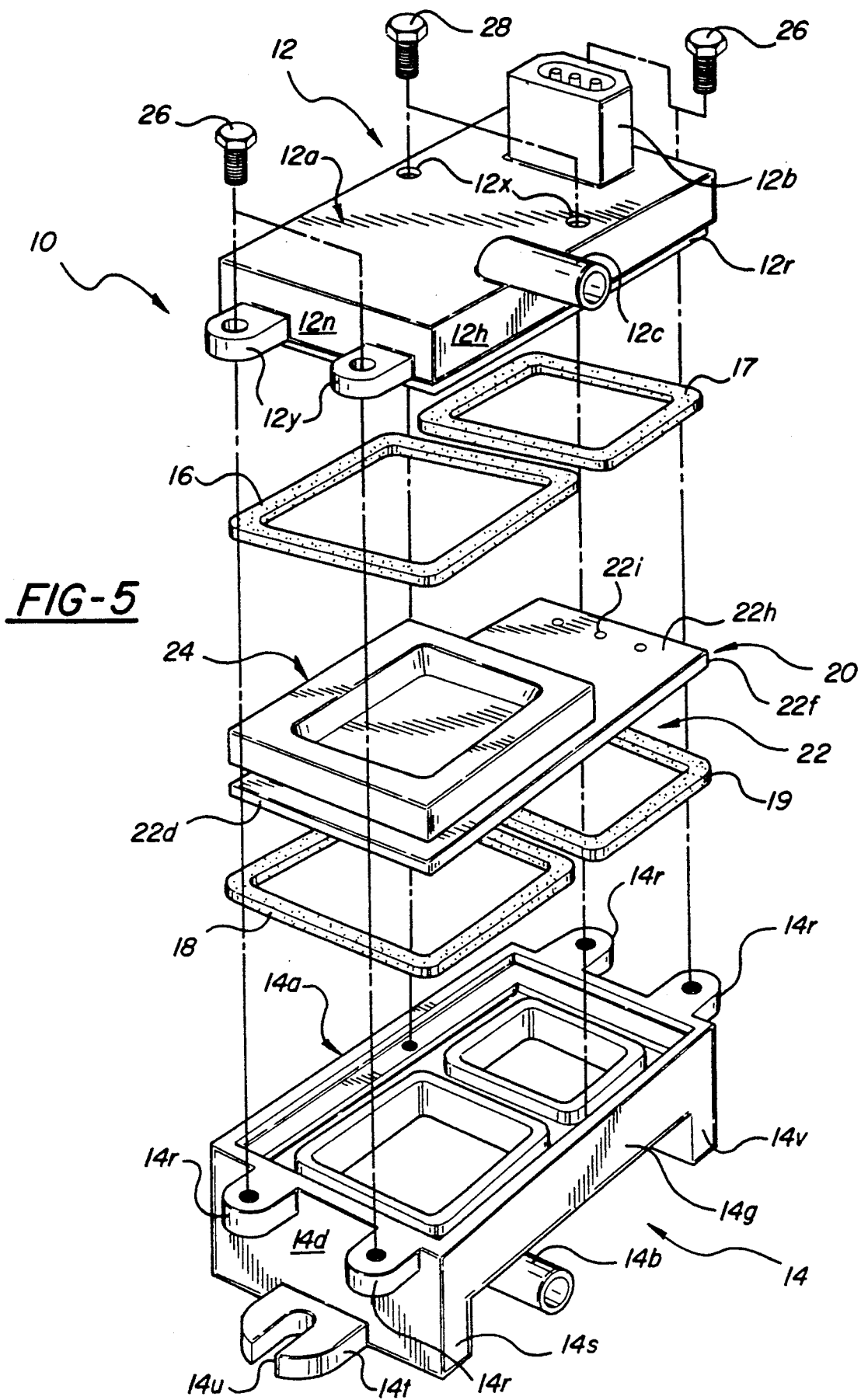
FIG. 5 is an exploded perspective view of the invention sensor.
Figure 8:
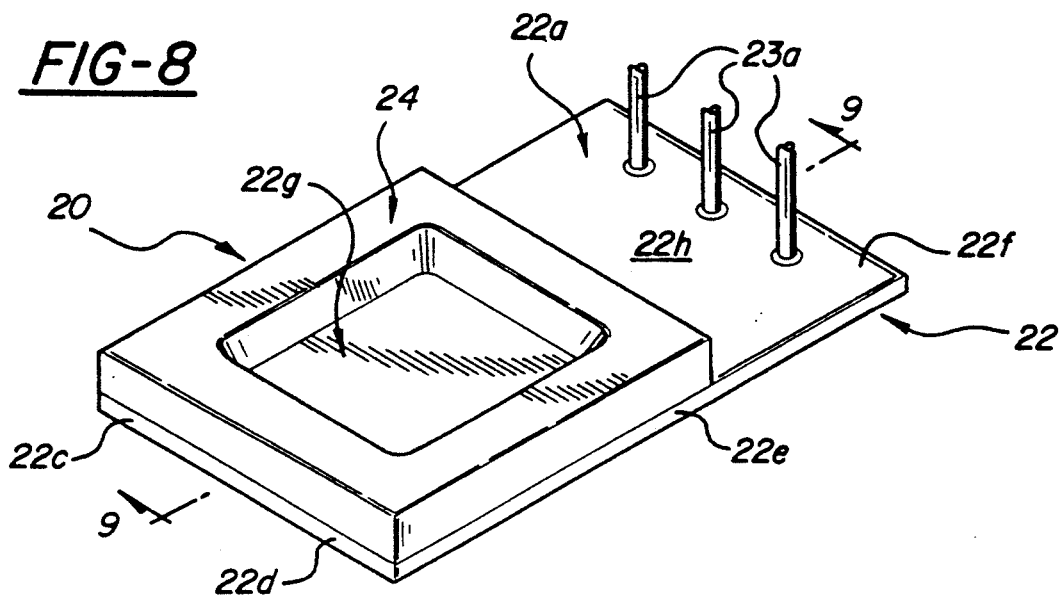
FIG. 8 is a perspective view of a board member assembly employed in the invention sensor.
Figure 9:
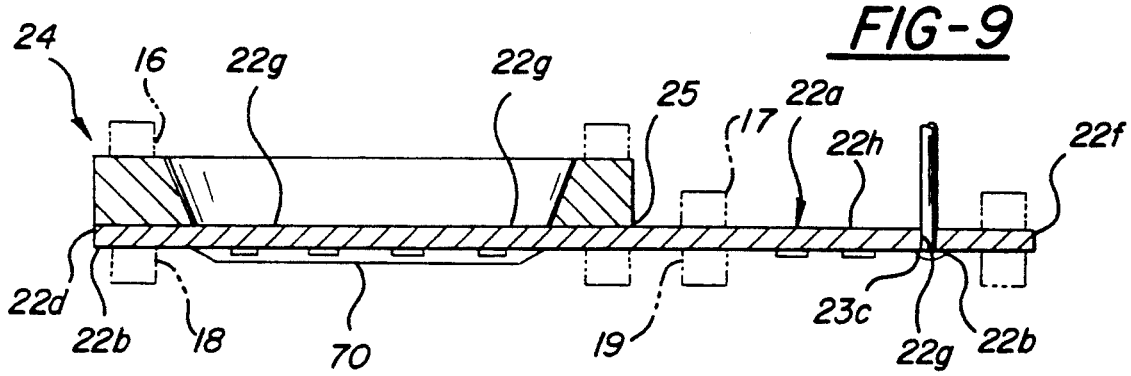
FIG. 9 is a cross-sectional view taken on line 9—9 of FIG. 8.

The invention sensor seen in FIGS. 1–10, broadly considered, includes an upper housing 12, a lower housing 14, upper seals 16 and 17, lower seals 18 and 19, and a board member assembly 20.

Upper housing 12 is formed of a suitable material such, for example as aluminum or a suitable plastic, and includes a main body portion 12a, an upstanding socket or receptacle portoin 12b, and a conduit or tube portion 12c.

Main body portion 12a includes an upper generally planar surface 12d, side edges 12e, 12f, 12g and 12h, and a lower surface generally indicated at 12i. Lower face 12i includes rectangular downwardly open cavities 12j and 12k and rectangular annular seal grooves 12l and 12m respectively surrounding rectangular cavities 12j and 12k. A downwardly extending flange 12r extends around the perimeter of the lower surface 12i of the upper housing in surrounding relation to the seal grooves and in surrounding relation to cavities 12j and 12k.

Socket portion 12b upstands from upper surface 12d proximate side edge 12g of the housing and defines a cavity 12s which terminates in a lower wall 12t in which is formed a rectangular opening 12u opening at its lower end in cavity 12k.

Tube portion 12c upstands from upper surface 12d proximate side edge 12h and in transverse alignment with cavity 12j and defines a central passage 12v which opens in cavity 12j at 12w.

Upper housing 12 further includes bores 12x extending through the housing and spaced lugs 12y at the opposite ends of the housing.

Lower housing 14 is also formed of a material such as aluminum or plastic and includes a main body portion 14a and a conduit or tube portion 14b.

Main body portion 14a includes a lower generally planar surface 14c, side edges 14d, 14e, 14f, and 14g, and an upper surface indicated generally at 14h. Upper surface 14h defines a relatively shallow rectangular cavity 14i corresponding in size and configuration to the cavity 12j in the lower surface of the upper housing, a relatively deep rectangular cavity 14j corresponding in size and configuration to the cavity 12k in the lower surface of the upper housing; and rectangular seal grooves 14k and 14l respectively disposed in surrounding relation to cavities 14i and 14j. The main body portion of the lower housing further includes an upwardly extending flange portion 14q extending around the periphery of the upper face of the housing, spaced lug pairs 14r at either end of the housing, a flange portion 14s at one end of the housing terminating in a mounting flange 14t defining a U-shaped mounting opening 14u, and a mounting flange 14v at the other end of the housing terminating in a mounting flange 14w defining a mounting hole 14x.

Conduit or tube portion 14b downstands from lower surface 14c proximate side edge 14g and in transverse alignment with cavity 14i and defines a central passage 14y opening at 14z in the lower face of cavity 14i.

Upper and lower seals 16, 17, 18 and 19 are identical, except as to specific size, are formed for example of silicone, and are sized and configured to seat respectively in grooves 12l and 12m in the lower surface of the upper housing 12 and in grooves 14k and 14l in the upper surface of the lower housing 14.

Board member assembly 20 includes a relatively thin plate member 22 and a relatively thick support member 24.

Plate member 22 is formed of a suitable ceramic dielectric material such as alumina and has a generally rectangular configuration defined by an upper surface 22a, a lower surface 22b, and side edges 22c, 22d, 22e and 22f.

Support member 24 has an annular rectangular configuration and has a thickness preferably at least twice as great as the thickness of thin plate 22. For example plate 22 may have a thickness of 0.010 inches and support member 24 may have a thickness of 0.240 inches. Member 24 may be formed of a variety of materials in so long as the chosen material has a coefficient of thermal expansion generally corresponding to the coefficient of thermal expansion of the ceramic material of the thin plate member 22. Member 24 may for example be formed of a suitable ceramic material or a glass material Member 24 is bonded to the upper face 22a of thin plate member 22 utilizing a glass frit 25. Annular support member 24 is bonded to thin plate member 22 proximate end edge 22d of the thin plate member to define a diaphragm portion 22g within and surrounded by the annular side walls of member 24. The portion 22h of the thin plate member 22 between member 24 and end edge 22f constitutes a mounting portion of the thin plate member.

In the assembled relation of the sensor, the board member assembly 20 is clamped around its perimeter between upper housing 12 and lower housing 14 with the flange 14n on the lower housing telescopically receiving coacting to define a pressure chamber 26 constituted by cavities 12j and 14i and an instrumentation chamber 28 constituted by cavities 12k and 14j; the outer perimeter of plate member 22 and support member 24 are seated snugly within the inner perimeter defined by flange 12r; the diaphragm portion 22g of plate member 22 extends across the pressure chamber 26 to divide the pressure chamber 26 into an upper pressure chamber portion 26a above the diaphragm portion and a lower pressure chamber portion 26b below the diaphragm portion; a plurality of connector pins or terminals 23 are positioned in spaced relation within the cavity 12s of socket portion 12b of the upper housing and extend downwardly through a suitable insulating material 24 positioned within cavity 12s and pass at their lower ends 23a through opening 12u and through respective bores 22i in the mounting portion 22f of the board member to position their respective lower tips 23b, 23c, and 23d in proximity to the planar underface 22b of the board member; seal 16 is positioned in groove 12l and sealingly engages the upper annular face of support member 24; seal 17 is positioned in groove 12m and sealingly engages the upper face 22a of plate member mounting portion 22h; seal 18 is positioned in groove 14k and sealingly engages the lower face 22b of plate member 22 in surrounding relation to diaphragm portion 22g; and seal 19 is positioned in groove 14l and sealingly engages the lower face 22b of plate mounting portion 22h. The seals operate to sealingly isolate the board member assembly from the exterior of the sensor and to sealingly isolate pressure chamber 26 from instrumentation chamber 28. Bolts 26 pass downwardly through holes in lugs 12y for threaded engagement with threaded bores in lugs 14r to maintain the upper and lower housings in tightly coupled relation with the board member assembly clamped therebetween and further bolts 28 extend downwardly through holes 12z in the upper housing member for threaded engagement with threaded bores 24 in the lower housing 14 to supplement the clamping action of the bolts 26.

It will be understood that, in use, the sensor is suitably secured to a support surface utilizing flange U opening 14u and flange mounting hole 14x and hoses 30 and 32 are respectively fitted over tube portions 12c and 14b of the respective housings to communicate the gas or fluid pressures in hoses 30 and 32 respectively with the upper and lower faces of the diaphragm portion of the plate member so as to produce selected deflection of the diaphragm portion in proportion to the pressure differential between the fluid pressures in upper and lower pressure chamber portions 26a and 26b as transmitted by hoses 30 and 32.

Figure 10:
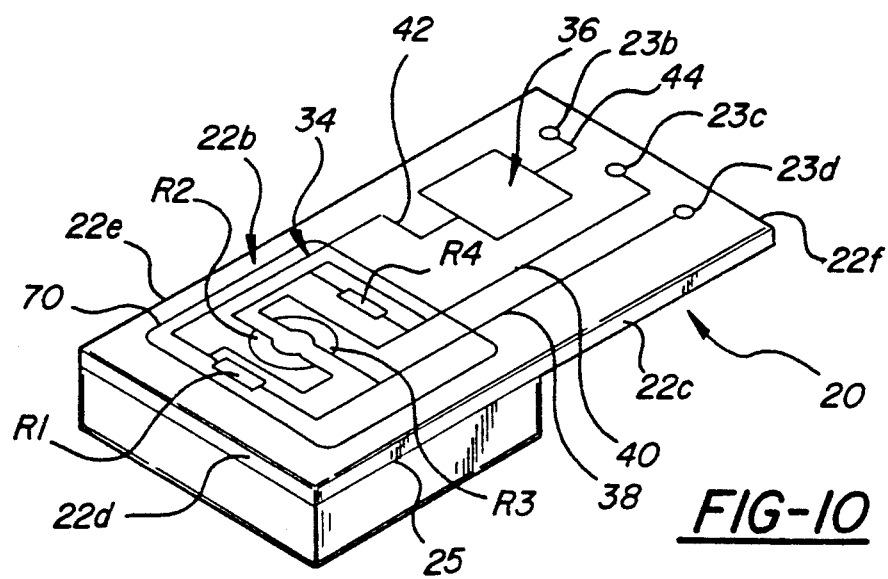
FIG. 10 is a perspective view showing the bottom of the board member assembly.

As best seen in FIG. 10, the lower planar surface 22b of plate member 22 is provided with a resistive strain gauge assembly 34 and a conditioning circuit 36. Specifically, strain gauge assembly 34 is provided on planar surface 22b in underlying relation to diaphragm portion 22g and conditioning circuit 36 is provided on planar surface 22b in underlying relation to mounting portion 22h.

Strain gauge assembly 34 includes strain gauges R1, R2, R3 and R4 which are distributed over the area of diaphragm portion 22g in a manner such that, with a given deflection of the diaphragm portion, certain of the gauges experience elongation and certain of the gauges experience compression. Specifically, strain gauges R1 and R4, by virtue of their positions proximate the perimeter of the diaphragm portion, will experience compression in response to upward deflection of the diaphragm portion and elongation in response to downward deflection of the diaphragm portion and strain gauges R2 and R3, by virtue of their positions proximate the central region of the diaphragm portion, will experience corresponding elongation in response to upward deflection of the diaphragm portion and corresponding compression in response to downward deflection of the diaphragm portion.

The terminals provided by the lower ends 23b, 23c, and 23d of the connector pins 23 comprise a central common ground terminal 23c flanked by positive terminals 23b and 23d. Ground terminal 23c and positive terminal 23d coact to provide an input voltage to the strain gauge assembly via leads 38 and 40. The strain gauges will be seen to be arranged in a well-known Wheatstone Bridge configuration with an output lead 42 transmitting the output voltage of the strain gauge assembly to conditioning circuit 36. Conditioning circuit 36 will be understood to include various circuit elements to modulate the output signal of the strain gauge assembly. Circuit 36 may include, for example, printed resistors for adjusting and balancing the circuit and for temperature compensation; discrete IC amplifiers to amplify the strain gauge output; discrete diodes for temperature compensation; and discrete capacitors for filtering out unwanted high response noise. The conditioned output signal is thereafter transmitted to the positive terminal 23b via a lead 44 so that, with a suitable power plug plugged into socket 12b for coaction with the connector pins 23, and in response to the generation of a differential pressure across the diaphragm portion 22g of plate member 22, an output voltage appears across the ground terminal 23c and positive terminal 23b which is proportional to the differential in pressure being experienced by the diaphragm portion.

Figure 11:
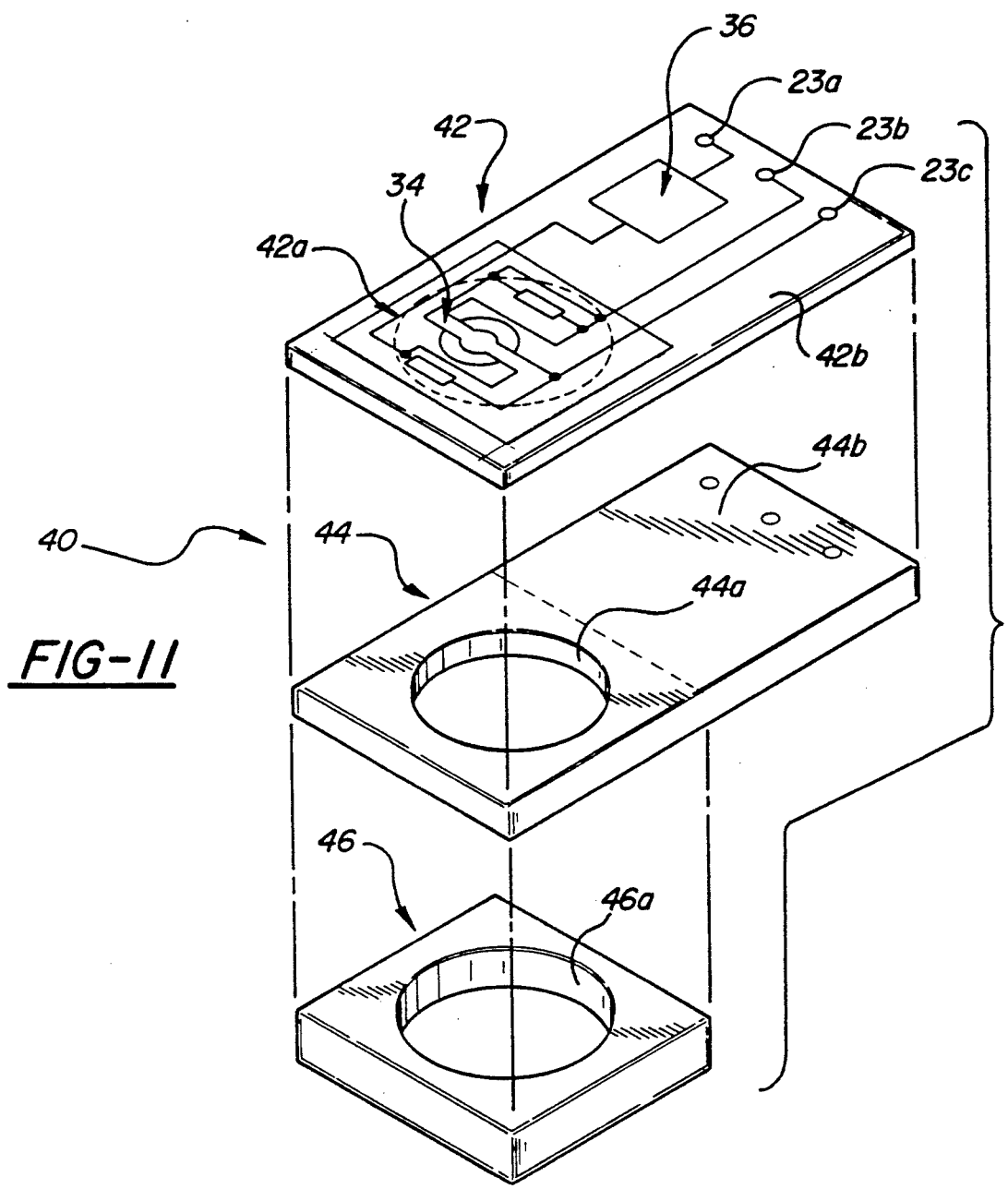
FIGS. 11 and 12 are exploded and cross-sectional views respectively of a modified form of the invention sensor.
Figure 12:
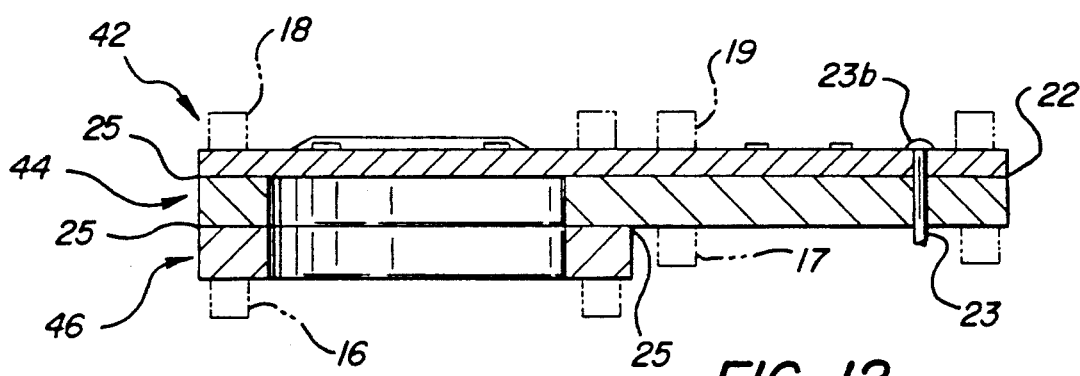

In the embodiment of the invention seen in FIGS. 11 and 12 the board member assembly 40 (shown inverted in the figures from its operational position within the sensor housing) includes a relatively thin rectangular plate member 42 generally corresponding to the plate member 22 of board member assembly 20; a substrate or support member 44 having a rectangular configuration generally corresponding to the configuration of plate member 42 and having a circular aperture 44a proximate one end of the member; and a support member 46 of square configuration and having a central circular aperture 46a corresponding in size to aperture 44a. Plate member 42 may be formed of a suitable ceramic material and may have a thickness of 0.010 inches; substrate member 44 may be formed of a suitable ceramic material and may have a thickness of 0.060 inches; and support member 46 may be formed of ceramic or other material such as glass having a coefficient of thermal expansion corresponding to that of ceramic and may have a thickness of 0.250 inches.

Members 42, 44 and 46 are bonded to each other in the assembled relation seen in FIG. 12 with the lower face of plate 42 member bonded to the upper face of substrate member 44 utilizing a glass frit 48 and with the upper face of support member 46 bonded to the underface of substrate member 44 utilizing a glass frit 48. In the assembled relation of the members, apertures 44a and 46a are aligned in surrounding relation to a diaphragm portion 42a of plate 42; terminal pins 23 extend through the mounting portions 44b and 42b of members 42 and 44 to provide terminal ends 23a, 23b and 23c; strain gauge assembly 34 is positioned on diaphragm portion 42a of the plate member 42; and conditioning circuit 36 is positioned on mounting portion 42b of plate member 42 in electrical communication with strain guage assembly 34 and terminals 23a, 23b and 23c.

When positioned in housings 12 and 14, seals 16, 17, 18 and 19 engage the board member assembly in the manner previously described with reference the FIGS. 1-10 embodiment to sealingly isolate the board member assembly from the exterior of the sensor and to sealingly isolate pressure chamber 26 from the instrumentation chamber 28.

In both of the embodiments, the circuitry on the lower face of the board member assembly, with the exception of the discrete circuit components, is preferably provided in a thick film screen printing operation in which suitable material is screen printed onto the lower planar face of the plate member of the board member assembly to provide the various elements of the circuitry. The screen printing is preferably carried out in a multi-step process in which first the conductors are printed utilizing gold, platinum or silver material, then the resistors (other than the strain gauge resistors) are printed utilizing suitable resistive material, and then the strain gauge resistors are printed utilizing a suitable thick film resistor material.

After the screen printing has been completed, a layer or thick film 70 of a dielectric glass material is suitably applied at least over the strain gauge assembly 34 as a protective coating for the strain gauge assembly. Coating 70 hermetically seals the strain gauge elements to insulate the strain gauge elements from the media whose pressure is being measured and to encapsulate the strain gauge elements in a common material to ensure a consistent coefficient of thermoexpansion throughout the strain gauge.

The invention will be seen to provide a board member assembly design that is extremely inexpensive and yet which retains superior performance characteristics.

Whereas preferred embodiments of the invention have been illustrated and described in detail, it will be apparent that various changes may be made in the disclosed embodiments without departing from the scope or spirit of the invention.

I claim:

1. A resistive strain gauge pressure sensor including a housing defining a chamber, a board member assembly mounted within the housing and extending across the chamber to divide the chamber into an upper chamber portion above the board member assembly and a lower chamber portion below the board member assembly, and a resistive strain gauge assembly positioned on the board member assembly and operative to receive a voltage input and generate a voltage output in response to the flexing of the board member assembly;

characterized in that the board member assembly includes a relatively thin plate member, including a diaphragm portion, and a relatively thick support member bonded to one face of .the thin plate member, and including an annular portion positioned in surrounding relation to the diaphragm portion of the thin plate member, and the resistive strain gauge assembly comprises a plurality of resistive strain gauge members positioned on the other face of the thin plate member on the diaphragm portion of the thin plate member.

2. A sensor according to claim 1 wherein an annular seal is positioned between the housing and the annular portion of the support member.

3. A sensor according to claim 2 wherein a further annular seal is positioned between the housing and an annular surface defined by the board member assembly in surrounding relation to the diaphragm portion.

4. A sensor according to claim 1 wherein the thin plate member further includes a mounting portion extending laterally from the diaphragm portion within the housing, terminal pins accessible without the housing and connected to the mounting portion, and a conditioning circuit provided on the other face of the thin plate member on the mounting portion of the thin plate member and electrically connected to the strain gauge assembly and to the terminal pins.

5. A sensor according to claim 1 wherein the board member assembly further includes another annular member secured to the free annular face of the annular portion of the support member.

6. A resistive strain gauge pressure sensor comprising a housing defining a chamber, a thin plate member positioned in the chamber and including a diaphragm portion proximate one end of the plate member and a mounting portion proximate the other end of the plate member, terminal pins extending into the chamber for connection to the mounting portion of the plate member, a conditioning circuit on the mounting portion of the plate member electrically connected to the terminal pins, a plurality of strain gauge members positioned on one face of the diaphragm portion of the plate member and electrically connected to the conditioning circuit and the terminal pins, and a relatively thick support member including an annular portion bonded to the other face of the diaphragm portion of the plate member in surrounding relation to the diaphragm portion of the plate member.

7. A sensor according to claim 6 and further including a first annular sealing member positioned between the housing and the annular portion of the support member and a second annular sealing member positioned between the housing and the one face of the diaphragm portion of the plate member in surrounding relation to the strain gauge members.

* * * * *